United States Patent [19]

Shimada et al.

[11] Patent Number: 4,851,259

[45] Date of Patent: Jul. 25, 1989

[54] GROUND IMPREGNATING PROCESS

[75] Inventors: Shunsuke Shimada; Takeshi Sato, both of Tokyo, Japan

[73] Assignees: Kyokado Engineering Co., Ltd.; Sanshin Corporation, both of Tokyo, Japan

[21] Appl. No.: 64,840

[22] Filed: Jun. 19, 1987

[30] Foreign Application Priority Data

Jun. 24, 1986 [JP] Japan .................. 61-146123

[51] Int. Cl.$^4$ .................. B05C 1/16; B05D 3/02
[52] U.S. Cl. .................. 427/136; 427/397.8; 427/426
[58] Field of Search .................. 427/136, 397.8, 426, 427/427

[56] References Cited

U.S. PATENT DOCUMENTS

| 996,513 | 6/1911 | Paterson | 427/136 |
| 1,067,426 | 7/1913 | Hemingway | 427/136 |
| 2,462,763 | 2/1949 | Nightingall et al. | 427/397.8 |
| 4,477,490 | 10/1984 | Weisberg | 427/136 |
| 4,536,417 | 8/1985 | Shimizu | 427/397.8 |
| 4,676,998 | 6/1987 | Nolte et al. | 427/397.8 |

FOREIGN PATENT DOCUMENTS 59-42769 10/1984 Japan .................. 427/136

Primary Examiner—Sadie Childs
Attorney, Agent, or Firm—Martin A. Farber

[57] ABSTRACT

A ground impregnation process which is disclosed herein comprises injecting an alkaline ground impregnating material, with carbon dioxide gas passed through blowing nozzles joining said impregnating material, into a ground. In this process, the pressure of carbon dioxide and the opening size of the blowing nozzle are determined to provide a constant amount of carbon dioxide gas blown, irrespective of a variation in ground pressure. In this manner, the carbon dioxide gas joins the alkaline ground impregnating material at a given ratio.

3 Claims, 3 Drawing Sheets

FIG. I

GROUND IMPREGNATING PROCESS

BACKGROUND OF THE INVENTION

1. Field of the Invention

The present invention relates to a ground impregnating process comprising injecting an alkaline ground impregnating material such as sodium silicate-based consolidating medium (sodium silicate is also referred to as "water glass"), with carbon dioxide gas joining the impregnating material, into a ground such as a weak ground or a water-leaked ground to provide consolidation or water cut-off of the ground, and particularly, to such a process, wherein control of the absolute flow rate of pressurized carbon dioxide gas is simplified, and carbon dioxide gas is allowed to join the aqueous sodium silicate solution at a given ratio to the aqueous sodium silicate solution within a range of acceptable ground pressures.

2. Description of the Prior Art

There has been proposed a medium injection process for injecting a medium consisting of an alkaline ground impregnating material such as sodium silicate and carbon dioxide gas serving as a hardening agent into a weak or water-leaked ground to provide consolidation or water cut-off of the ground.

In general, in injecting an aqueous sodium silicate solution and carbon dioxide gas into a ground in a joining manner, uniform aggregates of sodium silicate will be not formed unless carbon dioxide gas to be mixed is supplied at a substantially constant proportion in absolute quantity to the aqueous sodium silicate solution. This reason is as follows: If the pressure within the ground varies, the amount of carbon dioxide gas injected substantially varies, resulting in a failure to maintain a constant ratio to the sodium silicate, causing non-uniformity of a colloid material produced from the reaction of the sodium silicate and carbon dioxide and thus, a uniform aggregate is not provided. For example, in injection into the ground, if an injection rate per minute is kept constant, the injection pressure varies normally from zero to about 20 kg/cm$^2$. On the contrary, because the aqueous sodium silicate is liquid, the absolute amount thereof would not vary even if the injection pressure varies. However, carbon dioxide varies in volume and also in absolute amount if the injection pressure varies.

For one of approaches to the above problems, there has been proposed a medium injection system as described in Japenese Patent Publication No. 42769/84. This proposed system comprises an injection pipe inserted into a ground, a sodium silicate storage tank connected to the interior of the injection pipe, and a carbon dioxide gas bomb, wherein a pressure variation senser is interposed between the carbon dioxide bomb and the injection pipe, the pressure variation sensor being constituted of an automatic flow rate adjuster valve, a flow meter connected via a differential pressure transmitter and an opening and closing operator to a flow rate indication adjuster, and a pressure transmitting unit similarly connected via a graphic operator to the flow rate indication adjuster, these three components being connected sequentially between the injection pipe and the carbon dioxide tank, so that the absolute flow rate of carbon dioxide gas is controlled by the automatic flow rate adjuster valve operated by the flow rate indication adjuster on the basis of the results of calculation in both the operators, thereby injecting the aqueous sodium silicate solution and the carbon dioxide gas in a joining manner at a constant ratio of their absolute flow rates.

The above prior art injection system can provide an advantage that the provision of the pressure variation sensor between the carbon dioxide tank and the injection pipe makes it possible to inject the aqueous sodium silicate solution and carbon dioxide gas into a ground in a joining manner at a constant ratio of their aboslute flow rates, irrespective of a variation in ground pressure (kg/cm$^2$). In practice with this system, however, there is a necessity for a complicated control system for sensing a variation in ground pressure to supply a pressurized carbon dioxide gas in an amount to correspond to the ground pressure, resulting in an increased cost of equipment for the control system, and also providing practical problems of requirements for check in performance, control and maintenance of individual control elements as well as careful control of operation.

SUMMARY OF THE INVENTION

It is therefore an object of the present invention to provide a ground impregnation process comprising injecting an aqueous sodium silicate solution with a pressurized carbon dioxide gas joining the solution, wherein control of the absolute flow rate of pressurized carbon dioxide gas is simplified and the carbon dioxide gas is permitted to join the aqueous sodium silicate solution at a given ratio within a range of acceptable ground pressures and wherein the problems found in the above prior art can be overcome.

According to the present invention, the above object is accomplished by providing a ground impregnation process comprising injecting an alkaline ground-impregnating material with carbon dioxide gas blown through a blowing nozzle to join the impregnating material, into a ground, wherein the pressure of the carbon dioxide and the opening diameter or size of the blowing nozzle are determined to provide a pressure and amount of carbon dioxide gas blown kept constant, irrespective of a variation of the ground pressure, thereby permitting the carbon dioxide gas to join the alkaline ground impregnating material at a given ratio.

With the above ground impregnation process, the amount of carbon dioxide gas blown corresponding to the ground pressure can be readily provided only by changing of the opening diameter of the blowing nozzle and the pressure of carbon dioxide gas as desired, thus achieving the injection of the aqueous sodium silicate solution and carbon dioxide gas joining together at a given ratio into the ground, attendant with an effect that a uniform aggregate is formed.

Moreover, control of the flow rate of carbon dioxide is provided by the carbon dioxide gas blowing nozzle, leading to a simplified medium injecting operation and providing great improvements in ease of medium injection and in cost.

The above and other objects, features and advantages of the present invention will become apparent from the following description of preferred embodiment thereof, taken in conjunction with the accompanying drawings.

DETAILED DESCRIPTION OF PREFERRED EMBODIEMENT

Figure 1:
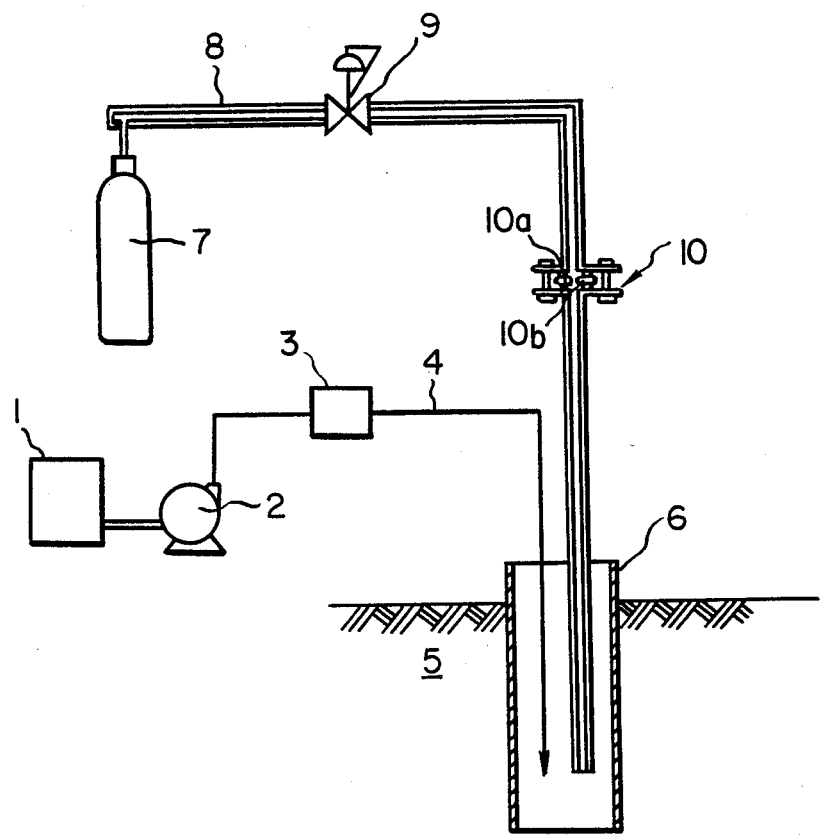
FIG. 1 is a schematic diagram illustrating a basic concept of the present invention.

Referring to FIG. 1, there is shown a system for carrying out the process of the present invention, and in this Figure, the reference numeral 1 designates a storage tank for an aqueous sodium silicate solution as an alkaline ground impregnating material, the reference numeral 2 being an injection pump and 3 being a flow meter. The aqueous sodium silicate solution is pumped at a predetermined flow rate through a piping 4 via the flow meter into an injection pipe 6 inserted in a ground 5 by the injection pump 2. This is the same as in the sodium silicate injecting line of the above-described medium injecting system. A line from the storage tank 1 for the aqueous sodium silicate solution to the injection pipe 6 is herein referred to as an impregnating-material delivery line.

In the present invention, a piping 8 is connected to an opening of a high pressure carbon dioxide bomb 7 and is also connected at its leading end to the injection pipe 6. The piping 8 is provided with a reducing valve 9 and a carbon dioxide gas blowing nozzle 10 having a disk 10a centrally perforated with a nozzle bore 10b, thus constituting a medium injecting system.

It should be noted that the piping 8 is arranged to provide for replacable mounting of a nozzle 10 of a different opening size. Alternatively, a plurality of carbon dioxide gas blowing nozzles 10 of different opening sizes may be switchably provided in parallel in the carbon dioxide gas delivery piping 8.

With the above system, an aqueous solution of sodium silicate is supplied into the injection pipe 6, while carbon dioxide gas is passed through the blowing nozzle 10 into the injection pipe 6, so that they are allowed to join together within the injection pipe 6.

The present invention contemplates that the pressure of carbon dioxide gas and the opening size of the blowing nozzle are determined to provide a given amount of carbon dioxide blown kept constant independent of a variation in ground pressure, thereby permitting the alkaline ground impregnating material and carbon dioxide gas to join together at a given ratio. The pressure of the carbon dioxide gas can be varied, as desired, by the operation of the pressure reducing valve 9, while the opening size can be varied, as desired, by replacement by a nozzle 10 of a different opening size.

Figure 2:
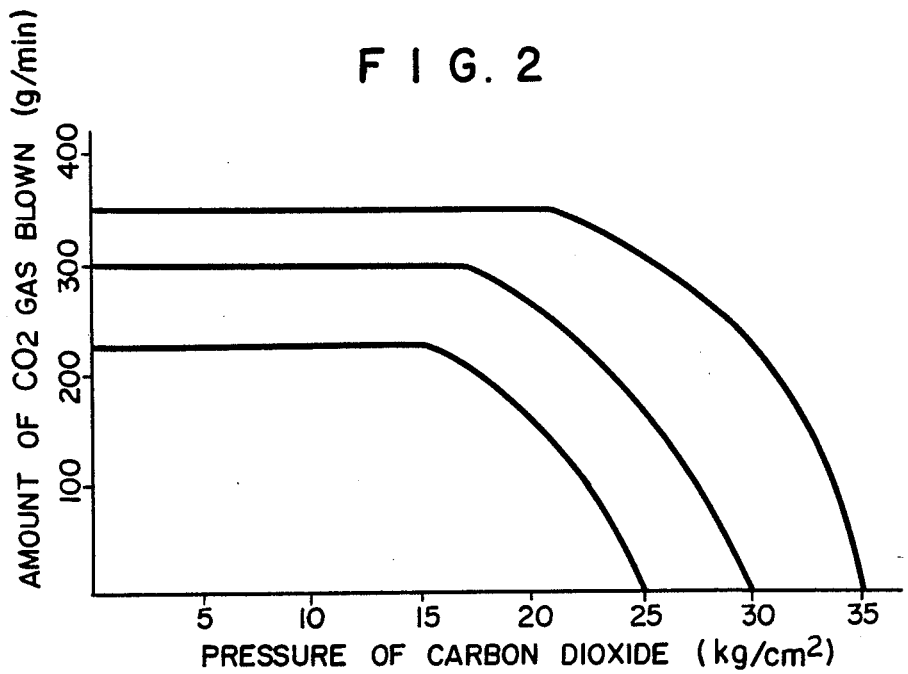
FIG. 2 is a graph illustrating the relationship between pressure of carbon dioxide gas and amount of carbon dioxide blown through a blowing nozzle having a opening diameter of 0.8 mm.
Figure 3:
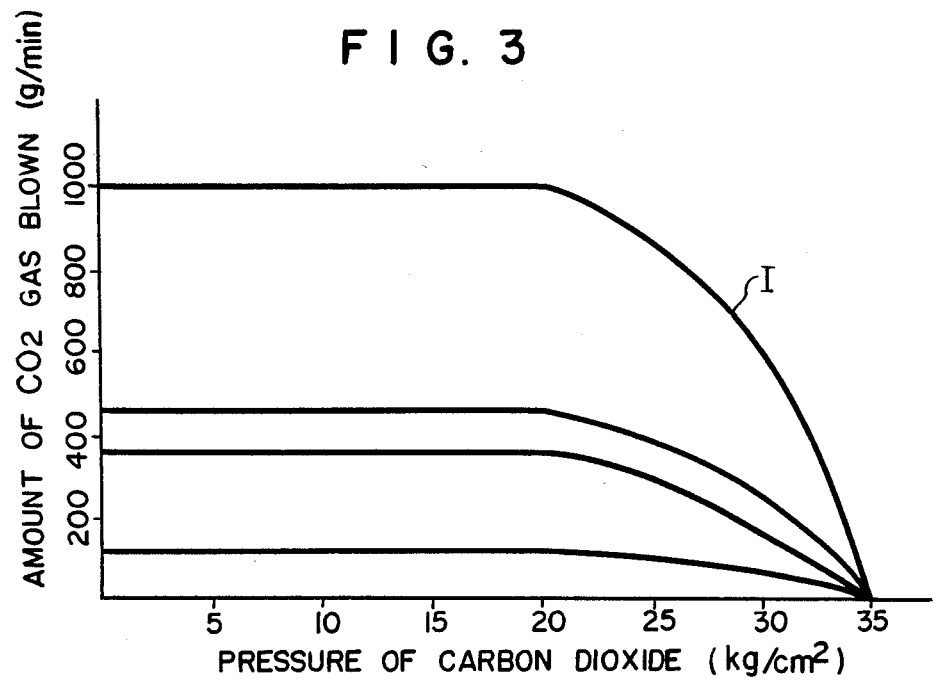
FIG. 3 is a graph illustrating the relationship between nozzle opening diameters and amount of carbon dioxide gas blown for a carbon dioxide pressure of 35 kg/cm$^2$.

Description will now be made of effects with reference to FIGS. 2 and 3 illustrating the results of the tests.

FIG. 2 illustrates the relationship between the pressures of carbon dioxide of 35, 30 and 25 kg/cm$^2$ and the amount of carbon dioxide gas blown, when use is made of a nozzle having a bore of an opening size of 0.8 mm centrally perforated in a disk having a thickness of 3 mm. It can be seen from FIG. 2 that the amount of carbon dioxide gas blown (g/min.) is constant within a certain range under the set pressures of carbon dioxide gas, but as exceeding a certain limit, the same gradually decreases. Thus, the amount of carbon dioxide corresponding to the ground pressure can be controlled by changing the pressure of carbon dioxide gas. This changing of the pressure of carbon dioxide can be accomplished by the pressure reducing valve.

FIG. 3 illustrates the relationship between the pressure of carbon dioxide gas set at a given value of 35 kg/cm$^2$ and the amount of carbon dioxide gas blown, with different opening sizes. The combination of several carbon dioxide gas blowing nozzles of different opening sizes makes it possible to provide a desired control of the amount of carbon dioxide gas corresponding to the ground pressure.

A line I in FIG. 3 indicates the amount of carbon dioxide gas blown, when two nozzles of opening size of 1 mm (amount of carbon dioxide gas blown from each nozzle: 450 g/min.) and a single nozzle of opening size of 0.4 mm (amount blown: 100 g/min.) are used in combination.

Alternatively, when the pressure of carbon dioxide gas is set at a constant level as in FIG. 3, a carbon dioxide gas blowing nozzle of a different opening size may be substituted to correpond to the ground pressure.

Figure 4:
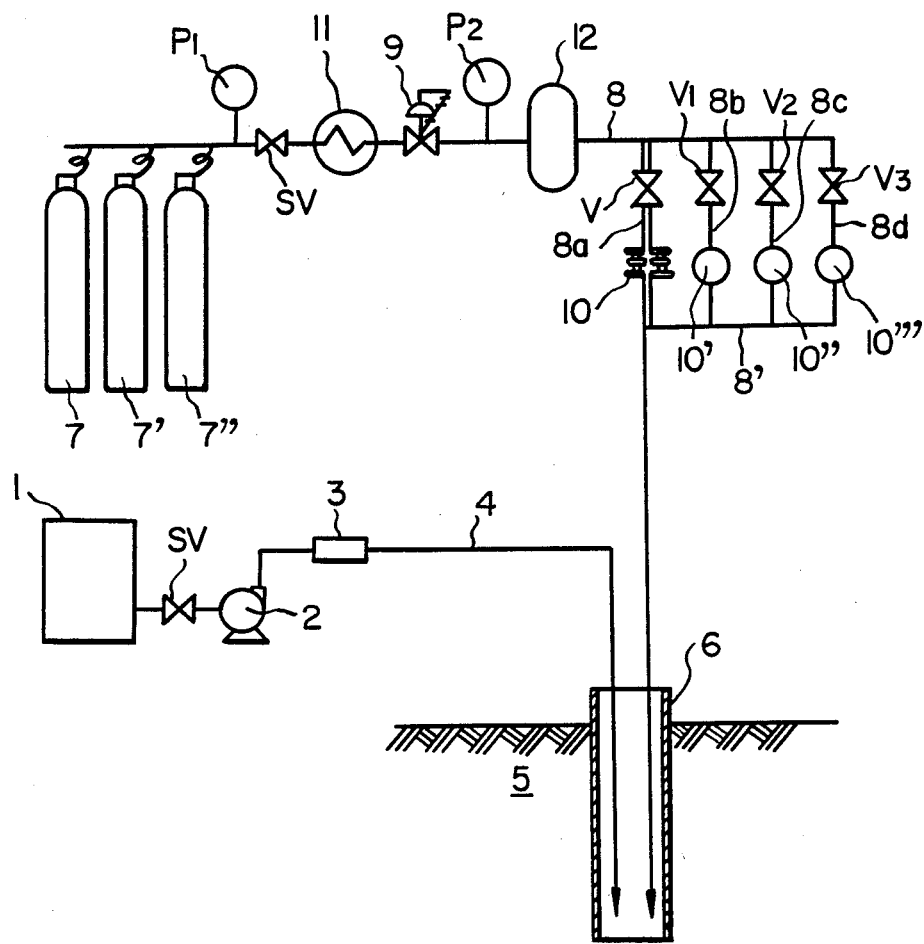
FIG. 4 is a diagram illustrating of a ground impregnation process according to one embodiment of the present invention.

FIG. 4 illustrates one embodiment of the present invention, wherein a supply of an aqueous solution of sodium silicate contained in a storage tank 1 is pumped by an injection pump 2, determined in a flow meter 3 and passed through a piping 4 into an injection pipe 6 inserted in a ground 5. A servo valve SV is provided in the piping 4 between the reservoir 1 and the pump 2.

A carbon dioxide delivery piping 8 is connected to openings of high pressure liquified carbon dioxide gas bombs 7, 7' and 7" and is provided with a servo valve SV, a heater 11, a reducing valve 9 and a carbon dioxide gas reservoir 12. A liquified carbon dioxide gas is gasified in the heater 11, and the resulting carbon dioxide gas is passed through the reducing valve 9 for reduction to a selected pressure and is stored under a predetermined pressure. Branch pipes 8a, 8b, 8c, and 8d are provided in parallel in the piping downstream of the gas reservoir 12 and each have a servo valve V1, V2, V3, V4 and a carbon dioxide gas blowing nozzle 10, 10', 10", 10''' provided therein. The individual branch pipes are connected to a piping 8' which is connected to the carbon dioxide gas delivery piping 8. The leading end of the delivery piping 8 is connected into the injection pipe 6. The pressure of carbon dioxide gas to be delivered is determined by a pressure meters P1 and P2 provided in the piping 8.

The blowing nozzles 10, 10', 10" and 10''' have different opening sizes, and one of these nozzles or the combination of two or more of the nozzles may be used to control the amount of carbon dioxide blown to correspond to the ground pressure, for joining of the flows of the aqueous sodium silicate solution and carbon dioxide gas at a given ratio of flow rates and for injection of them into the ground through the injection pipe 6.

The alkaline ground impregnating materials which can be used in the process of the present invention include aqueous sodium silicate solutions or mixtures of sodium silicates and reactants, liquid impregnating materials such as cement and slag, and impregnating materials containing an alkali which will produce a neutralizing reaction with carbon dioxide.

What is claimed is:

1. In a ground impregnation process comprising injecting sodium silicate-based consolidating material, with carbon dioxide gas joining said consolidating material, delivered through a piping and passed through at least one blowing nozzle provided with said piping, into a ground, said piping being provided with a pressure reducing valve together with said blowing nozzle, the improvement comprising the steps of determining the pressure of carbon dioxide and the opening size of the blowing nozzle to provide a constant amount of carbon dioxide gas blown irrespective of variation in ground pressure, and varying the operation of the reducing valve, while varying the opening size of the blowing nozzle by replacement by a nozzle of a different opening size, for providing said constant amount of carbon dioxide gas blown, so as to permit said sodium silicate-based consolidating material and carbon dioxide gas to join together at a given ratio.

2. The ground impregnation process as claimed in claim 1, wherein said sodium silicate-based consolidating material is an aqueous solution.

3. The ground impregnation process as claimed in claim 1, wherein the replacement step comprises providing and selectively operating a plurality of the blowing nozzles having different opening sizes in parallel in said piping.

* * * * *